Figure 1:
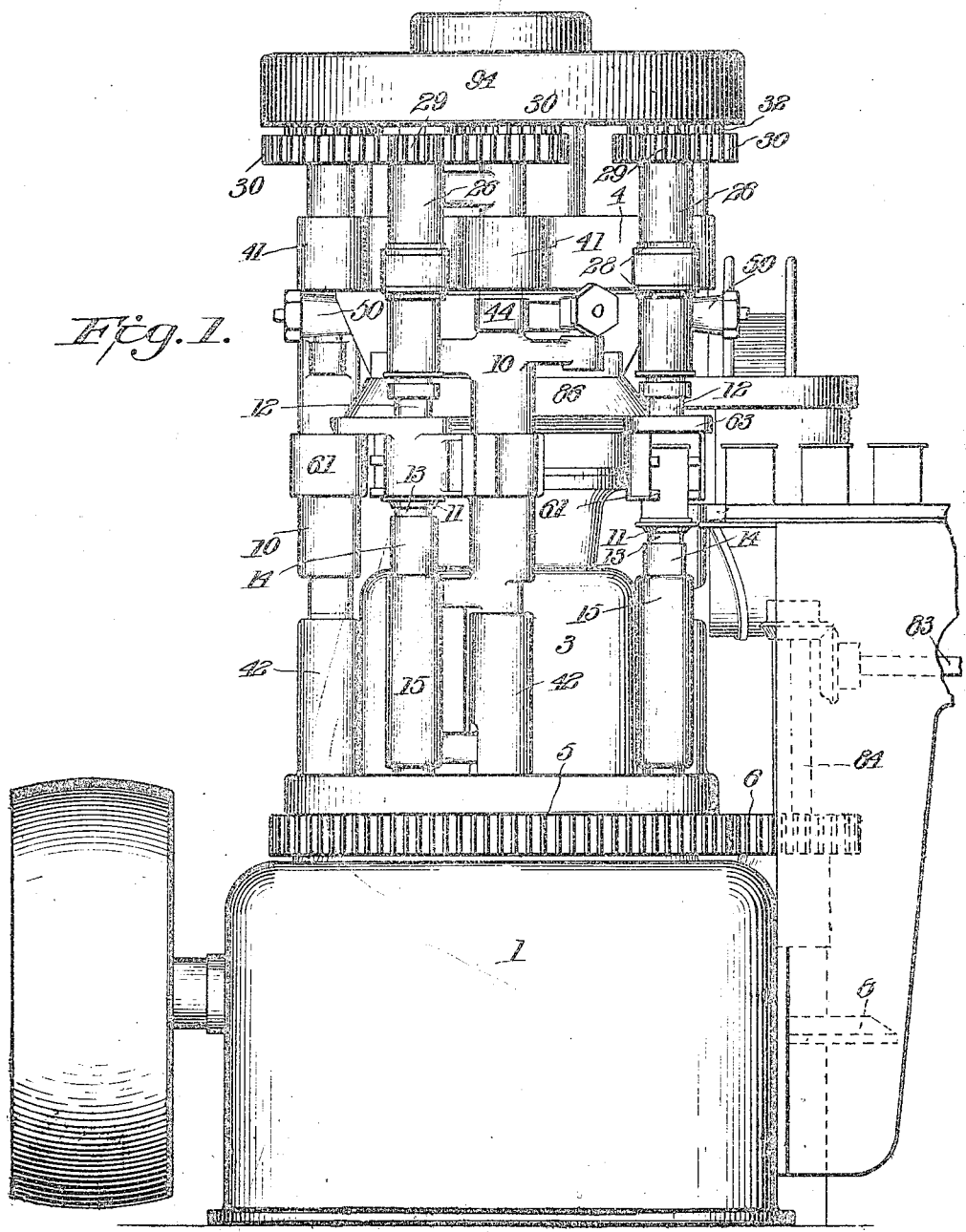

I. F. WARME.
CAN CLOSING MACHINE.
APPLICATION FILED JULY 24, 1912.

1,151,840.

Patented Aug. 31, 1915.
10 SHEETS—SHEET 1.

WITNESSES

INVENTOR
Ivar F. Warme
By Sturtevant & Mason
Attorneys

I. F. WARME.
CAN CLOSING MACHINE.
APPLICATION FILED JULY 24, 1912.

1,151,840.

Patented Aug. 31, 1915.
10 SHEETS—SHEET 4.

WITNESSES

INVENTOR
Ivar F. Warme
By Sturtevant & Musson
Attorneys

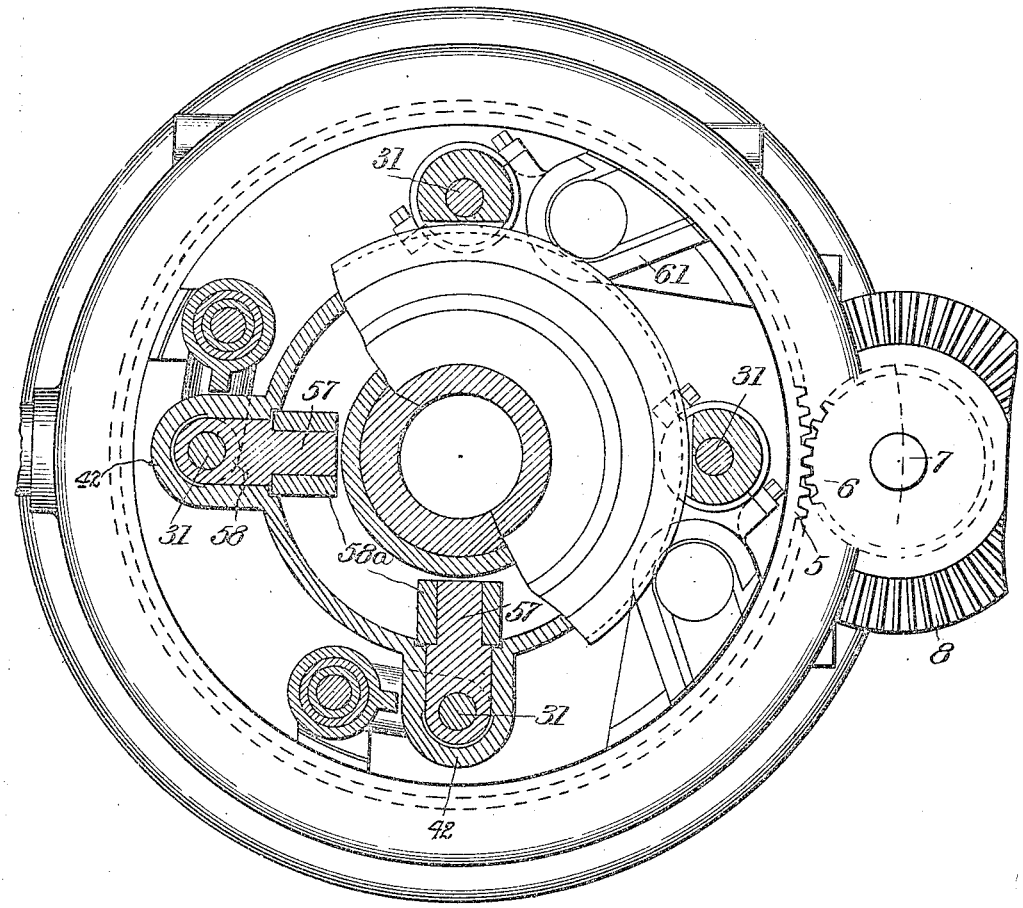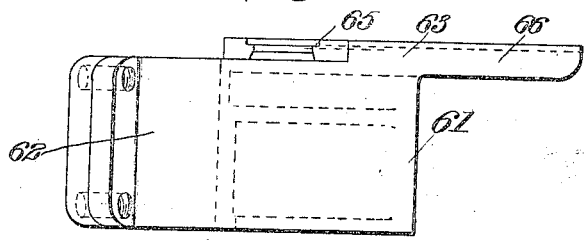

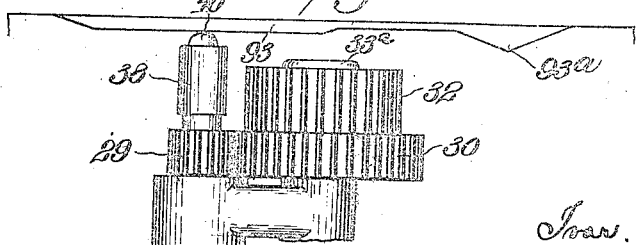

I. F. WARME.
CAN CLOSING MACHINE.
APPLICATION FILED JULY 24, 1912.

1,151,840.

Patented Aug. 31, 1915.
10 SHEETS—SHEET 7.

WITNESSES

INVENTOR
Ivar F. Warme
By
Attorneys

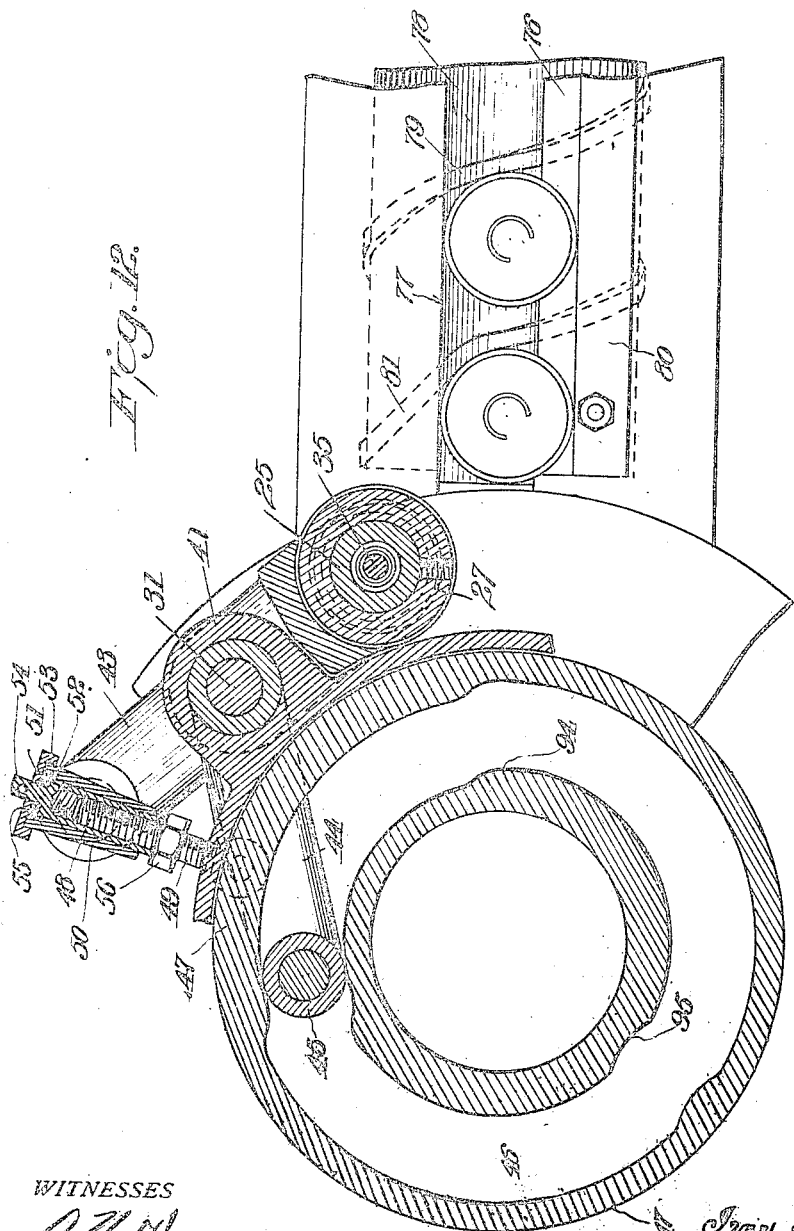

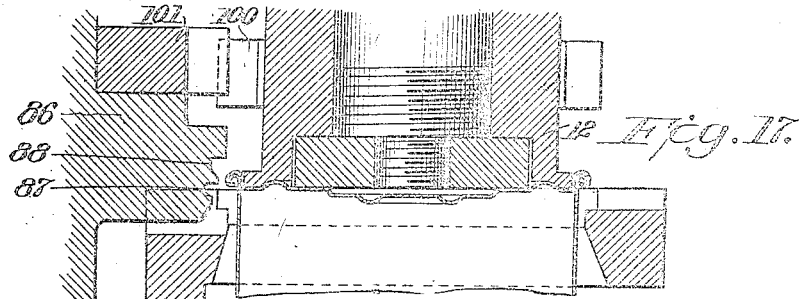
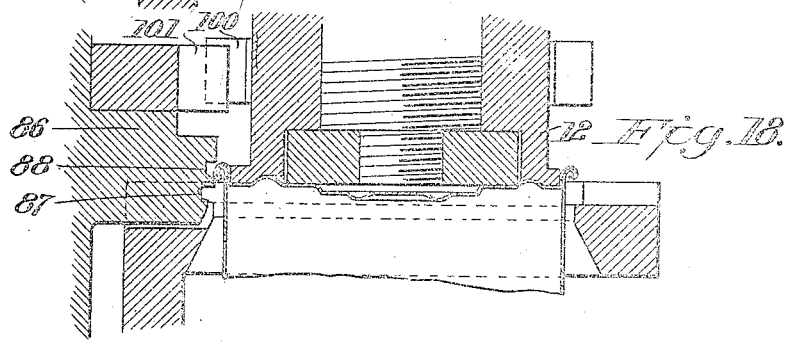
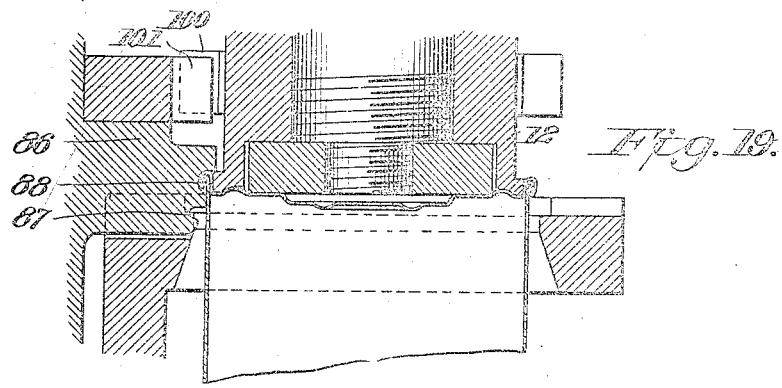
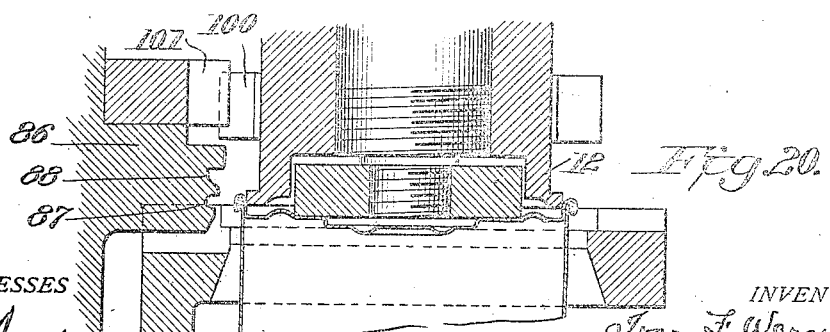

UNITED STATES PATENT OFFICE.

IVAR F. WARME, OF SYRACUSE, NEW YORK, ASSIGNOR, BY MESNE ASSIGNMENTS, TO CONTINENTAL CAN COMPANY, INC., A CORPORATION OF NEW YORK.

CAN-CLOSING MACHINE.

1,151,849.  Specification of Letters Patent.  Patented Aug. 31, 1915.

Application filed July 24, 1912. Serial No. 711,292.

*To all whom it may concern:*

Be it known that I, IVAR F. WARME, a citizen of the United States, residing at Syracuse, in the county of Onondaga, State of New York, have invented certain new and useful Improvements in Can-Closing Machines, of which the following is a description, reference being had to the accompanying drawing and to the figures of reference marked thereon.

The invention relates to new and useful improvements in machines for placing an end or a cover on a can and more especially to machines of this character for double seaming a cover on a filled can.

An object of the invention is to provide a machine of the above character, wherein the filled cans may be placed on a continuously moving carrier or turret, and the cover or end secured to the filled can during the travel of the carrier or turret by a double seam which is formed by a seaming member which operates simultaneously upon a plurality of cans.

A further object of the invention is to provide a machine of the above character with means for receiving a filled can and a can cover, which cover is seated in the can during the continuous rotation of the carrier.

A further object of the invention is to provide a machine of the above character wherein the filled cans may be engaged by rotating chucks which are continuously rotated during the travel of the carrier, and which chucks are so mounted as to be moved laterally to bring the end seam for the cover and can body into contact with the seaming roll.

A further object of the invention is to provide a closing machine of the above character, wherein the chuck is moved laterally to bring the end seam into contact with the first operation roll, then laterally to be released therefrom, after which the chuck is raised and again moved laterally to bring the end seam into contact with the second operation roll.

A further object of the invention is to provide a can closing machine wherein a continuously rotating carrier or turret is provided with a plurality of traveling seaming stations each of which includes a swinging frame carrying a rotating chuck, and a rotating support for the filled can, which rotating support and chuck are moved laterally as the frame swings, so as to bring the filled can into operative relation with a closing roll, whereby the end seam is formed for joining the cover to the can body.

These and other objects will in part be obvious and will in part be hereinafter more fully disclosed.

Figure 2:
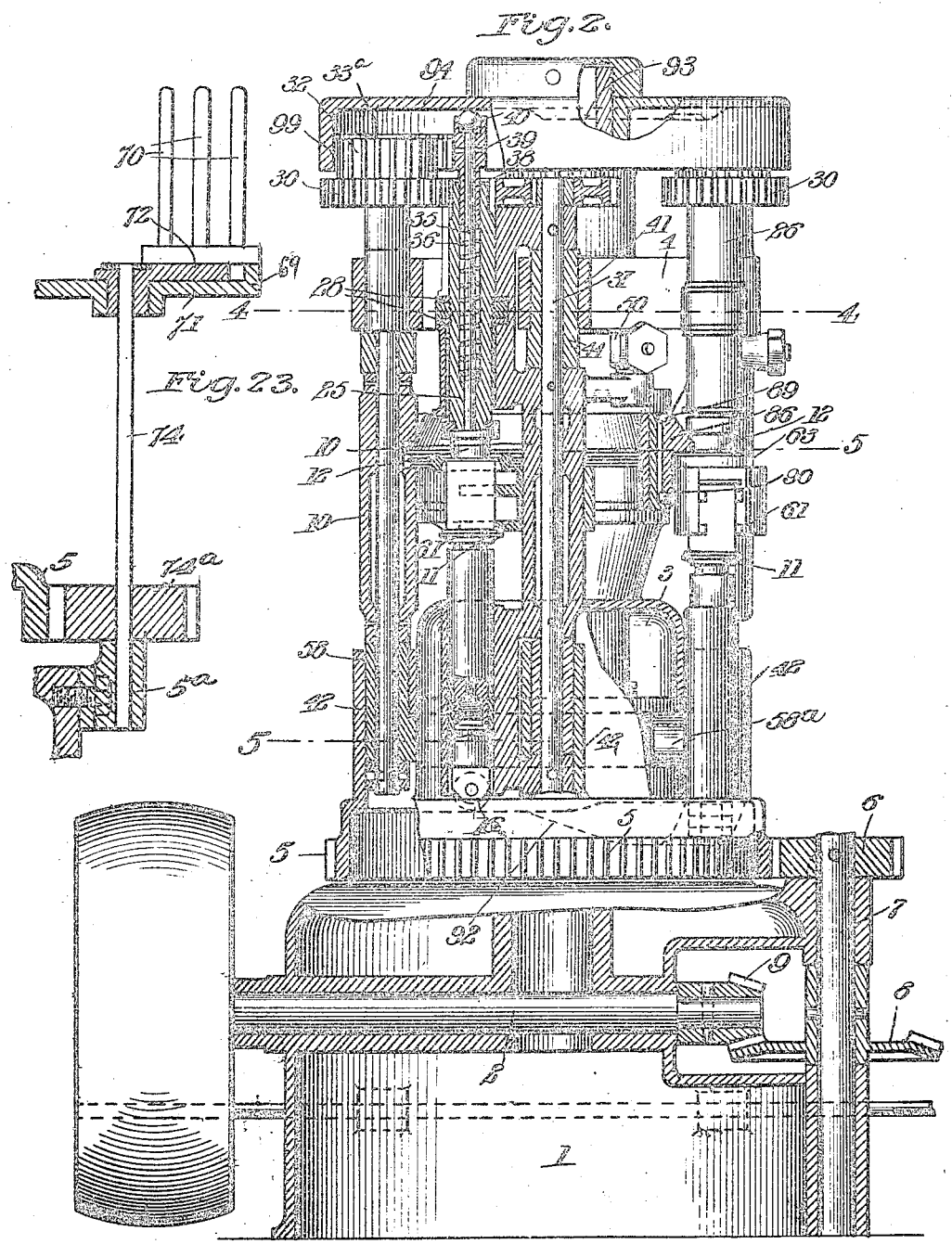
Figure 3:
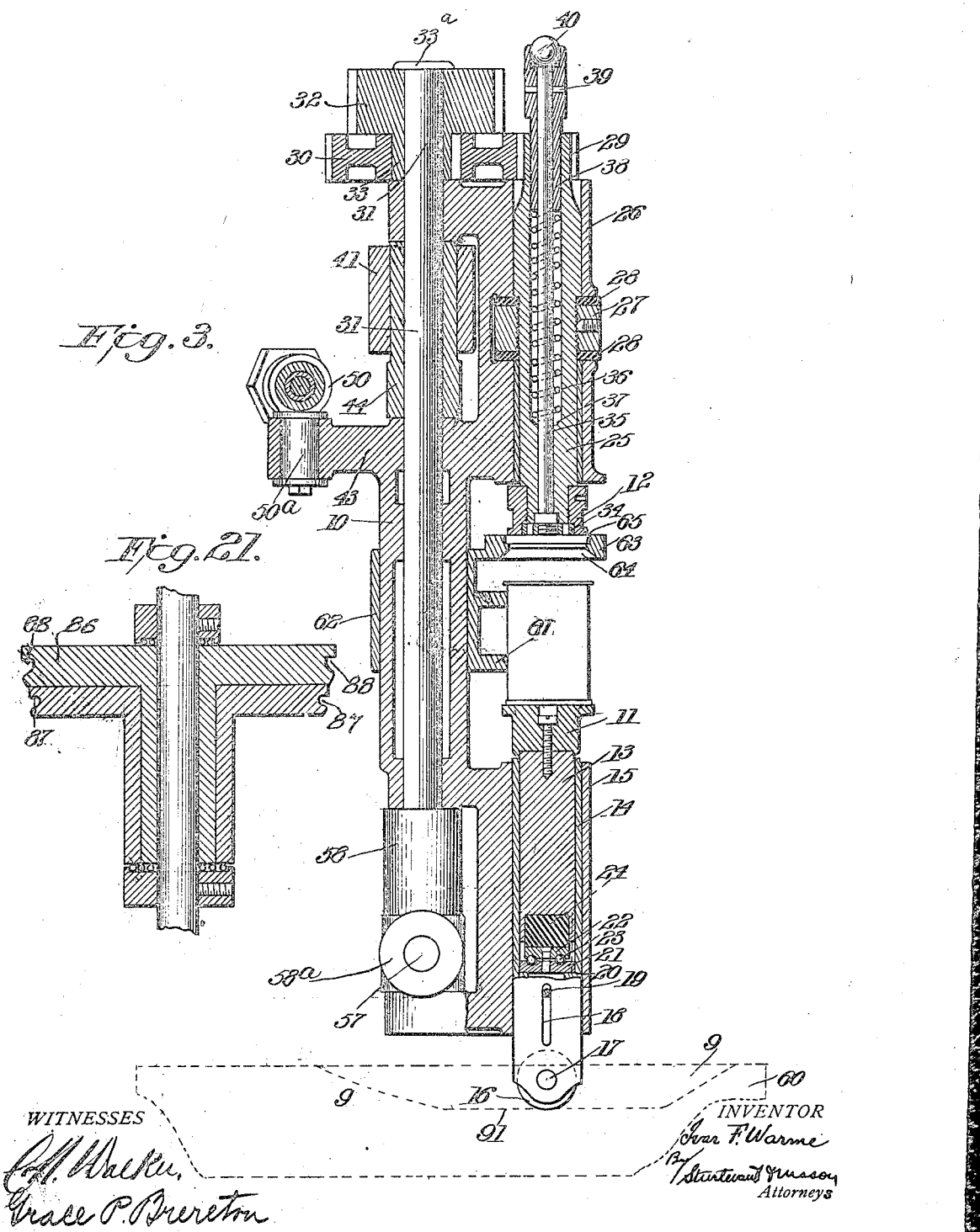
Figure 4:
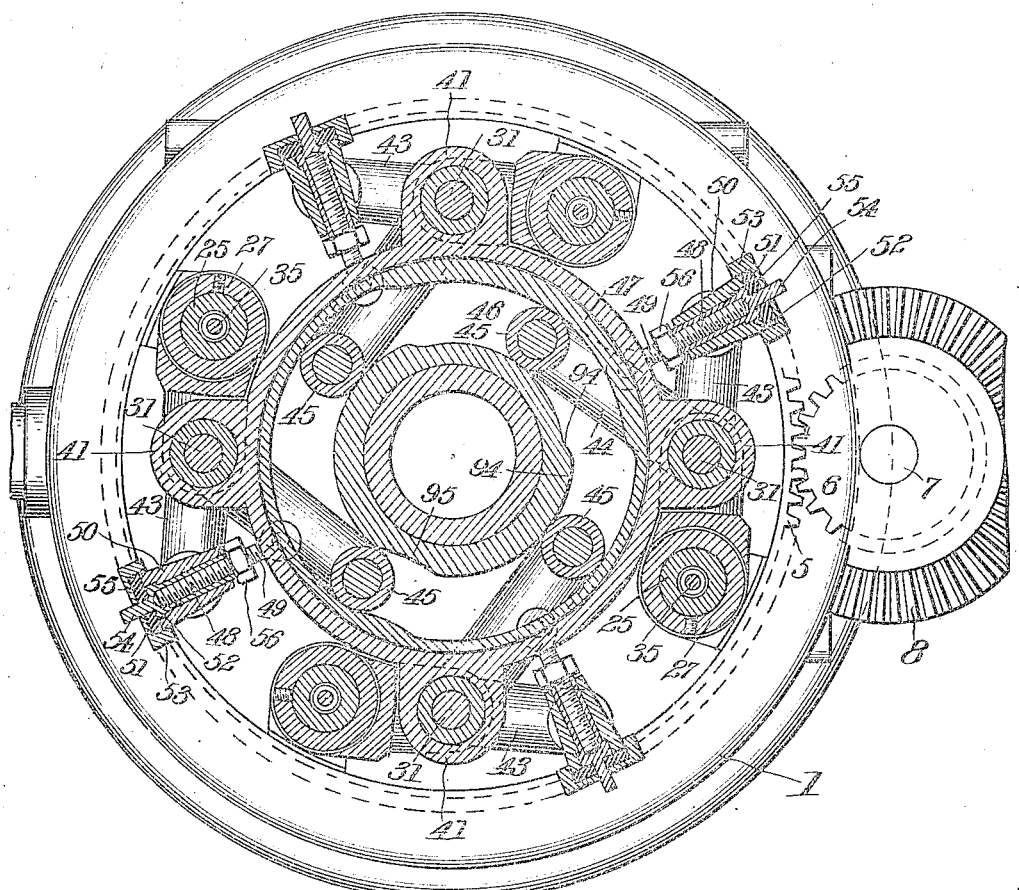
Figure 10:
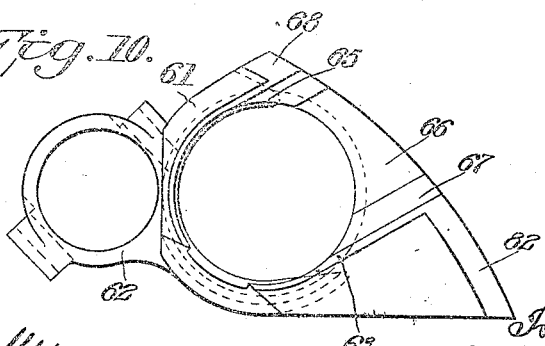
Figure 7:
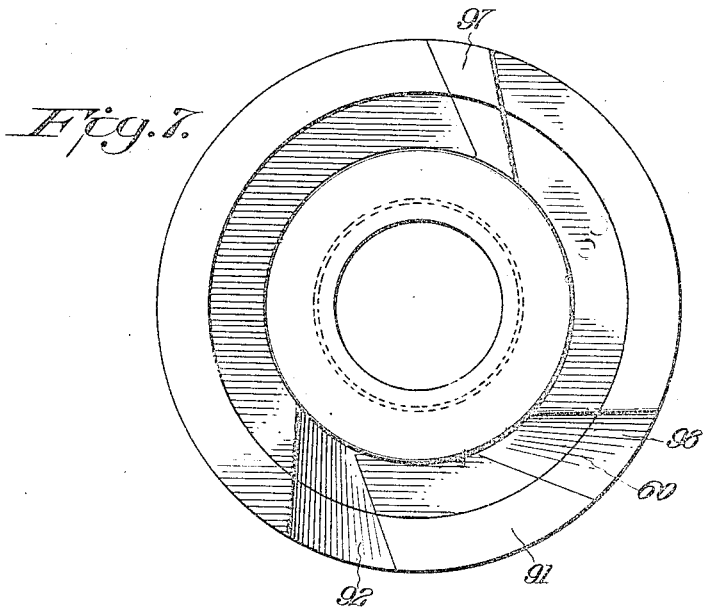
Figure 8:
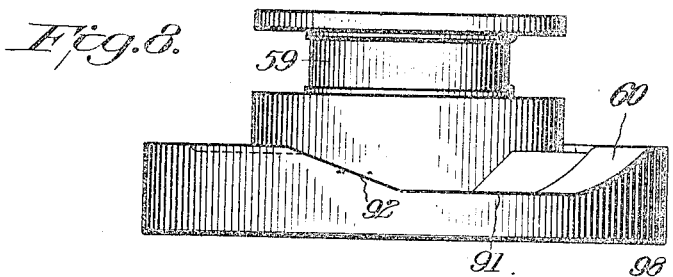
Figure 9:
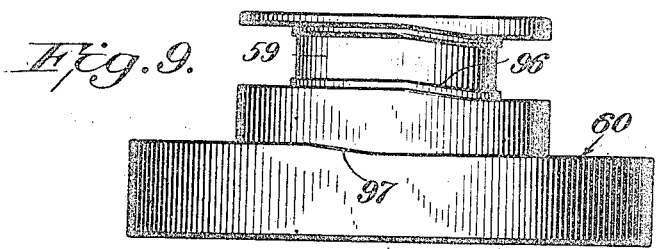
Figure 13:
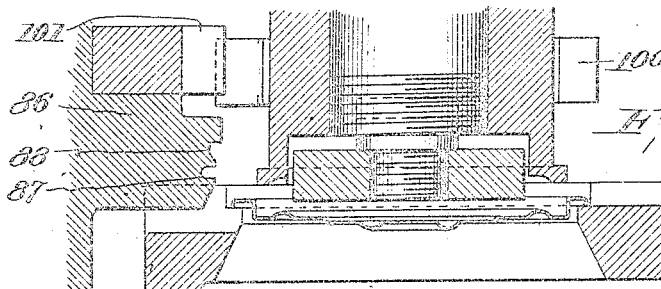
Figure 14:
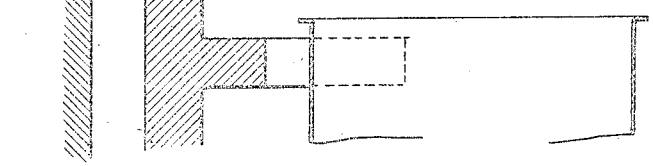
Figure 15:
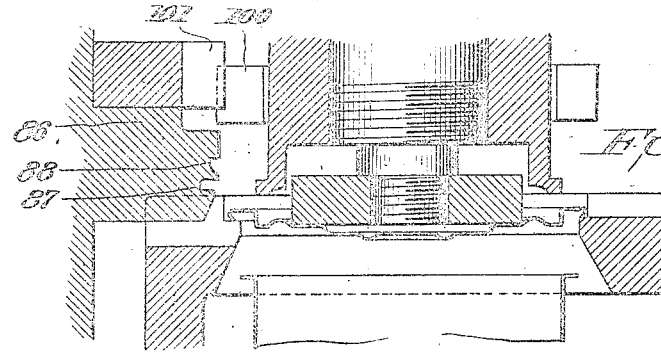
Figure 16:
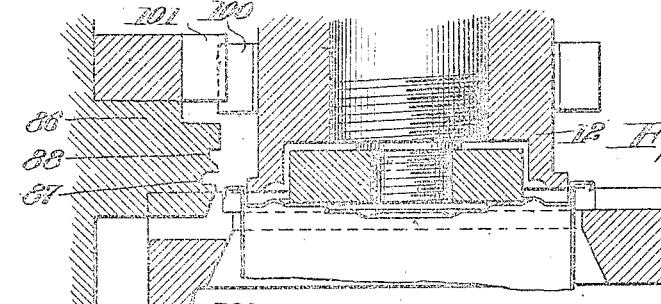

In the drawings which show by way of illustration one embodiment of the invention; Figure 1 is a front view of a closing machine embodying my improvements; Fig. 2 is a similar view, with parts broken away and sectioned, so as to show the detail construction of the swinging frame, the can support, the rotating chuck, and the seaming roll; Fig. 3 is a sectional view on an enlarged scale, through the swinging frame which carries the rotating chuck and the can support; Fig. 4 is a transverse section on the line 4—4 of Fig. 2, the connecting link for the swinging frame also being shown in section; Fig. 5 is a sectional view on the line 5—5 of Fig. 2; Fig. 6 is a plan view of the machine, with parts broken away and parts in section transversely to show at one point the feeding of the cover to the holder therefor, and to show at another point, the drive for the rotating chuck; Fig. 7 is a plan view of the cams for raising and lowering the can support, and the swinging frame; Fig. 8 is a side view thereof; Fig. 9 is a view similar to Fig. 8, showing a different portion of the cam; Fig. 10 is a plan view of the cover holder, and can centering device; Fig. 11 is a side view of the same; Fig. 12 is a detail on an enlarged scale, showing one of the swinging frames, the cam for operating the same, and the means for feeding the cans on to the can support on each swinging frame; Fig. 13 is a detail in section, showing the closing roll, the rotating chuck, the cover holder, and the can body guide when the can is being moved into the guide and the cover is placed in the holder; in this figure a gear is shown on the chuck for positively rotating the seaming roll. Fig. 14 is a similar view showing the seating pad engaging the cover, and the can being raised to engage the cover; Fig. 15 is a similar view showing the cover seated in the can body, and the can being raised into engagement with the chuck; Fig. 16 shows the can as engaged by the chuck, and moved laterally into contact with the first operation groove; Fig. 17 is a view showing the first operation completed, and the can moved from contact with the groove and being raised so as to be brought into engagement with the second operation groove; Fig. 18 shows the can as it is brought into engagement with the second operation groove; Fig. 19 is a similar view showing the completion of the second operation; Fig. 20 is a similar view showing the closed can as being stripped from the rotating chuck. Fig. 21 is a detail in cross section, showing the seaming roll made in two sections; and Fig. 22 is a view of the upper end of the swinging frame, showing the cam for operating the seating pad. Fig. 23 is a detail on a small scale in vertical section, showing the means for operating the cover feed.

In carrying out the invention, I have provided a can closing machine which includes a continuously rotating carrier or turret on which are mounted a plurality of seaming stations which travel with the carrier. Each of these seaming stations consists of a swinging frame which carries a can support and a rotating chuck, and also a seating or stripping pad. The filled cans are moved along a stationary table by a drum having a thread thereon which projects through a slot in the table and conveys the filled cans to the rotating carrier. These cans are forced from the stationary table on to the support carried by the swinging frame during the travel of the carrier. The covers for the cans are fed from a stack to a holder mounted on each swinging frame, and in alinement with the support for the filled cans. This holder is also provided with guides for positioning the can on the support.

As the carrier rotates, the can support is raised so as to engage the cover. A seating pad is positively moved downward against the cover before the can engages the same, and therefore, the cover will be firmly seated in the can body, after which the can is raised into contact with the rotating chuck which rotates the can and its support. During the travel of the carrier, the swinging frame is moved so as to bring the end seam for the cover and the can body into contact with a seaming roll having a first and a second operation groove which is of uniform shape throughout the entire circumference of the roll. The end seam engages the first operation groove, after which the frame swings laterally, the entire frame is raised, and the end seam brought into contact with the second operation roll. Then again, as the frame swings away from the seaming roll, the can is stripped from the rotating chuck and discharged from the machine.

Referring more in detail to the drawings, my invention consists of a can closing machine which comprises a supporting base 1, in which is mounted a main shaft 2, said supporting base being provided with suitable journals therefor. This supporting base 1 is provided with a central stationary standard which extends vertically through the machine. Mounted to rotate on said standard is a lower turret 3 and an upper turret 4. These two turrets are suitably secured together so as to rotate in unison, and in timed relation to each other. As a matter of fact, as herein shown, the upper turret is rotated by the lower turret. This lower turret 3 is provided with a gear 5 located at its lower end, and this gear meshes with a pinion 6 carried by a vertical shaft 7 also journaled in suitable bearings in the supporting base 1.

The shaft 7 carries a bevel gear 8 which meshes with a bevel pinion 9 on the end of the driving shaft 2. As the driving shaft rotates, the shaft 7 will impart to the turrets 3 and 4 a continuous rotation. Mounted on the two turrets 3 and 4, are a plurality of swinging frames 10, which as herein shown, are four in number. Each of these frames and the parts supported thereby, are similar in construction, and a description of one will answer for all. Each frame 10 carries a rotatable can support 11, and a rotating chuck 12. The can support 11 is mounted on a stem 13, which is rotatably journaled in a sleeve 14 mounted to move freely vertically in the lower bracket 15 of the swinging frame 10. The sleeve 14 carries a roller 16 at its lower end, which is mounted to turn about a pivotal support 17. The sleeve is formed with a vertical slot 18, and a pin 19 extends through the slot and is mounted in the bracket arm 15. This pin prevents the sleeve from rotating, but allows the same to move vertically in the bracket arm. The sleeve is formed with a seat 20 on which rests a hardened plate 21. A second hardened plate 22 rests on balls 23 and these plates 21 and 22 are suitably grooved to form a race for the balls. A yielding block 24 is placed between the upper plate 22 and the lower end of the stem 13 for the can support. The lower end of the stem is bored out to receive the yielding block. By this construction, the can support is free to rotate in the supporting sleeve therefor, and any end thrust on the stem will be carried by the ball bearing. Furthermore, the stem is allowed to yield slightly relative to the lifting roller 16, by reason of the intervening yielding block. The rotating chuck 12 is threaded on to the lower end of the chuck sleeve 25. This chuck sleeve is mounted to rotate freely in the upper bracket arm 26 of the swinging frame 10. The upper bracket arm 26 is cut away centrally thereof, and the chuck sleeve has a nut 27 threaded thereon, which is located in the cut-away portion of the sleeve.

This chuck sleeve is provided with suitable wearing washers 28, 28, which engage the bracket arm 26 and hold the chuck sleeve from endwise movement relative to the bracket arm. A pinion 29 is formed directly on the upper end of the chuck sleeve. This pinion coöperates with a pinion 30 mounted to turn freely on the upper end of a rod 31, which passes through the swinging frame, and is rigidly secured thereto.

A pinion 32 is mounted to rotate freely on the rod 31, and is formed with a hub 33, which supports and is keyed to the pinion 30. A cap plate 33ª is secured to the upper end of the rod 31, and holds the gears or pinions 30 and 32 in place. The rotating chuck 12 is cut-away centrally thereof, so as to receive a seating pad or plate 34. This seating pad is carried by a rod 35 which extends through the rotating chuck sleeve. The chuck sleeve is bored out so as to form a recess for a spring 36, which surrounds the rod 35. This spring rests at one end against a shoulder 37 which is formed on the chuck sleeve, while the other end of the spring bears against a sleeve 38 mounted on the rod 35, and extending into the chuck sleeve. This sleeve on the rod for the seating pad is keyed to the rod by a pin 39. The upper end of the sleeve 38 is formed with a pocket or recess for a ball 40, the purpose of which will be hereinafter described.

The upper turret 4 is formed with bearings 41, each of which serves as a journal for the upper end of a swinging frame. The lower turret 3 is also provided with bearings 42 which serve as a journal for the lower end of each swinging frame. The frame is swung about the center of the rod 31 as an axis in the journals 41 and 42, by an arm 43 which is carried by the swinging frame. An arm 44 is loosely journaled on the rod 31, and carries a roller 45 at its outer end, which engages a cam groove 46 in a cam disk mounted on the central stationary supporting standard, and is keyed thereto so as to remain stationary while the carrier or turrets rotate about the same. The same disk is located within the upper turret 4. This arm 44 is connected to the rigid arm 43 by a link 48. This link consists of a threaded bolt 49, which is pivoted to a lug carried by the arm 44. A sleeve 50 is carried by a stem 50ᵃ, which is freely journaled in the outer end of the arm 43. An inner sleeve 51 extends through the sleeve 50, and is formed with an enlarged head 52 which seats against a shoulder on the sleeve 50. This inner sleeve 51 is threaded so as to engage the threads on the bolt 49. A cap 53 is screwed on to the outer end of the outer sleeve 50. The inner sleeve 51 is formed with a projecting part 54, which extends through the cap and is formed with a transverse opening adapted to receive a pin or tool, whereby the inner sleeve may be turned.

A yielding block or washer 55 is interposed between the cap and outer end of the inner sleeve.

A set nut 56 is threaded on to the bolt 49, and serves merely to lock the bolt to the inner sleeve.

From the above construction, it will be apparent that when the arm 44 is swung by the action of the cam thereon, said arm through the link connection with the arm 43, will swing the frame about the rod 31 as an axis. This swinging of the frame will move laterally the rotating chuck, and the can support. The movement of the rotating chuck and the can support toward the axis of the closing machine, will be a yielding movement, owing to the interposing of the yielding block or washer 55 between the cap 53, which is carried by the arm 43 and the inner sleeve 51 which is pivotally connected to and movable by the arm 44.

The swinging frame is raised and lowered bodily as a whole, by an arm 57, which arm is carried by a sleeve 58 fixed to the rod 31 and engaging the lower supporting journal 42 for the swinging frame. This arm 57 carries a roller 58ᵃ which engages a cam groove 59 formed in a member fixedly carried by the supporting base. This member is shown in detail in Figs. 7 to 9 inclusive. The support for the can body is raised and lowered by a cam 60 carried by the same member in which the cam groove 59 is formed. This cam 60 coöperates with the roller 16 at the lower end of the sleeve which carries the can support. The construction of these cams for raising the can support and the swinging frame, and the resulting effect thereof, will be described more fully hereinafter.

In order to center the filled can on the can support, I have provided a can body centering guide 61. This guide is in the form of a sleeve 62 which is attached to the swinging frame, and has two spaced arc-shaped guides which are in line with the support for the can body, so that the can body when moved on to the support, will be held by these guides. I have also provided said sleeve which supports the guiding members for the can body, with a laterally projecting bracket forming a cover holder 63. This cover holder projects laterally over the can support, and is formed with a tapered central opening 64. The cover holder is also formed with a supporting ledge 65, on which the cover is seated and held until the filled can is raised into engagement therewith. The tapered opening 64 serves to engage the upper end or open mouth of the filled can, and to round up or true the same, and to also center the same for engagement with the cover. This cover holder is also formed with a laterally projecting ledge 66 (see Fig. 6), and with guiding ribs 67 and 68, which serve to guide the cover on to the seating ledge 65.

The covers are fed to the cover holders from a stack holder 69. This stack holder is formed with a base plate having upright rods 70 between which the covers are stacked. An opening is formed through the base plate, which allows the covers in the stack to pass through the base plate on to the cover support 71. An arm 72 is provided with a separating lip 73 and is mounted on a rotating shaft 74. The shaft 74 carries a gear $74^a$ which meshes with the gear 5 on the lower turret 3. This shaft is journaled in a bracket $5^a$ at its lower end. The cover support is formed with an upwardly projecting ledge 75. As the shaft 74 rotates, the lip 73 will pass between the lowermost cover in the stack and the next adjacent cover, and separate said lowermost cover from the stack, while the arm 72 will engage the separated cover and carry the same from the stack along the support 71. The ledge 75 will assist in guiding the cover as it is moved along the support, and the cover will be transferred from the support on to the cover holder. The end of the arm 72 as it passes by the cover, will force said cover into its seat. This shaft 74 is driven in proper timed relation to the movement of the carrier, so as to feed the covers into the cover holders during the continued travel of the carrier.

The filled cans are fed to the can supports from a stationary table 76. This table is formed with a slot 77 in its upper face, and a drum 78 having a thread 79 wound thereon, moves the can bodies along the table. This thread projects through the slot in the table, and engages the bottoms of the cans which rest partly on the table and partly on the drum, and gradually moves the cans toward the rotating carrier. A guiding rail 80 serves to guide the cans lengthwise of the table. The table is so constructed as to conform in curvature to the path of travel of the can support as the carrier rotates. The thread 79 is provided at the end of the drum with a portion 81 which is made of relatively steep pitch. The drum is timed so that this relatively steep portion of the thread will engage the can and quickly move it forward on to the can support, while the can support is traveling past the end of the table. To prevent any improper movement of the can as the support is approaching, I have provided the centering guide for the can body with a laterally projecting curved portion 82, which serves to hold back the can until the support is in proper position to receive the same. The thread on the drum will seat the can body on the support, and the arc-shaped guides will tend to hold the can body on the support properly centered relative thereto.

The drum 78 may be rotated from a shaft 83 which is connected by suitable gearing with a vertical shaft 84 driven from the main driving shaft. The shaft 74 for feeding the covers, may also be suitably driven from the main driving shaft. The closed cans are stripped from the can support by any suitable stripping finger, which causes the cans to enter the receiving table 85 (see Fig. 6). This receiving table extends underneath the cover support 71.

The double seam for joining the cover to the can body is formed by a double seaming roll 86 which is provided with a first operation groove 87, and a second operation groove 88. This seaming roll 86 is mounted on the upper and lower turrets on ball bearings 89 and 90, so that the seaming roll is free to rotate independently of the rotation of the turret.

The first operation groove 87 is of uniform cross section throughout its entire circumference. Likewise the second operation groove 88, is also of uniform cross section.

In the operation of my device, the filled cans are placed on the supporting table 76, and are carried along by the threaded drum and finally discharged one at a time on to the can supports 11. This transfer of the filled cans to the can support takes place during the continued rotation of the carrier, and each seaming station as it passes the table, will receive a filled can. The cover holder for each seaming station is also supplied with a cover from the stack by the rotating shaft 74, and the arm 72 which slides the cover along the cover support 71 into the cover holder. As the support for the cans passes the table 76, the roller 16 is traveling on the lowermost portion 91 of the cam 60. As the carrier continues to rotate, the roller 16 will travel up the incline 92 of the cam 60, and carry the filled can up against the cover. Prior to the filled can reaching the cover, the seating pad 34 will be moved down against the cover by the roller 40 coming into contact with a cam 93 on the under face of the cap plate 94 which is mounted on the central upright standard of the machine. This cam 93 positively moves the seating pad down into contact with the can cover. This positioning of the parts is shown in Fig. 14 of the drawings. A further upward movement of the support for the cans will cause the cover to be seated in the can body, as shown in Fig. 15. The seating pad will rise as the ball at the upper end of the rod for the seating pad passes off the cam 93, and will allow the filled can to be carried up into engagement with the chuck 12, as shown in Figs. 16. As soon as the cover which is seated in the filled can is brought into contact with the chuck, the filled can will at once take up the rotations of the chuck. The cam 30 and the cam 93 are so shaped and timed that after the cover is seated in the filled can, the seating pad will clamp the cover and can body against the support therefor, so that the cover is held on the can by the seating pad, as it is moved into engagement with the rotating chuck. As soon as the can is rotating with the chuck, the swinging frame 10 is moved about its axis through the action of the roller 46 in the cam groove 48. That is to say, the roller 45 travels out on to the radially displaced cam ledge 94. This swings the frame so as to bring the rotating can into contact with the seaming roll. The rotating chuck and swinging frame are at this time so positioned that the flange of the can cover engages the first operation groove, as shown in Fig. 15. The rotating of the can while in contact with the seaming roll will cause the seaming roll to rotate or travel on its supporting bearings about the carrier. This rotation of the seaming roll prevents any slipping of the can in the groove in the seaming roll, and therefore, the wear incident to the closing of the can by the rolling of the metal, is comparatively little. Furthermore, by this construction wherein the seaming roll may be rotated as the can is closed, so that a rolling contact causes the metal to curl into the seam, the seam may be formed with much less strain or applied force on the rotating parts. As soon as the first operation roll has completed the first operation on the can cover, the swinging frame is moved in the opposite direction by the offset portion 95 in the cam 46. This withdraws the cover from the seaming roll, and the filled can is raised so as to be presented to the second operation roll, as shown in Figs. 17 and 18. This raising of the filled can which is now being rotated by the chuck, is brought about by a simultaneously upward movement of the swinging frame and the can support. The roller 58ª travels up an incline 96 in the cam 59, and the roller 16 travels up an incline 97 in the cam 60 (see Fig. 9). This causes the can to be raised without releasing it from the chuck. As soon as the filled can is positioned vertically for the second operation, the swinging frame is again moved so as to move the can support and the chuck toward the seaming roll, by reason of the roller 45 passing out of the offset 95. A continued travel of the carrier causes the second operation to be completed as shown in Fig. 19; after which the swinging frame is again moved away from the seaming roll by the roller 45 traveling inwardly on the cam 46. The swinging frame then moves down to the proper level for presenting the can body to the first operation roll, and the support for the can is also lowered as the roller 16 runs down the incline 98. The center rod carrying the seating pad, also engages a cam 98ª on the cap 94 which positively forces the rod downward, and forces the can from engagement with the rotating chuck. The timing of the downward movement of the rod for the seating or stripping pad, is such that the can while still held on the support, is released from the chuck. The support continues its downward movement to the position for receiving the filled can, and the closed can is stripped from the support on to the receiving table. The chucks are rotated by a stationary internal gear 99, which is carried by the cap 94 and meshes with the gears or pinions 82, which operate the chucks.

From the above description, it will be apparent that I have provided a can closing machine wherein a plurality of seaming stations are moved continuously past the feeding-in and feeding-out points, each station is supplied with a filled can and with a cover while the carrier is moving; the cover is seated on the can; and the filled can with the cover, is moved into engagement with a seaming roll which is common to all the stations; and the first, and then the second, operations for making the double seam are performed by this seaming roll, during the continued travel of the carrier.

While I have described the seaming roll as rotating on the carrier through the contact of the can with the roll, said seaming roll may be positively rotated with the chuck, as shown in Figs. 18 to 20, inclusive. As herein shown, a gear 100 is mounted on the chuck sleeve, and a gear 101 is secured to the seaming roll. These gears have intermeshing teeth, which are made sufficiently long to allow the chuck sleeve to be moved laterally for the seaming operations, without moving said teeth out of engagement. Each chuck sleeve may be provided with a gear, and these gears will cause the seaming roll to positively rotate. When it is desired to adjust the machine for different size cans, this may be readily accomplished by removing the centering guides and cover holders, and replacing the same with a different size which is suitable to the can desired to be operated upon. The chucks are also removed, and new chucks substituted therefor. The supports 41 for the can bodies, are removed, and a support substituted therefor, which is of proper height to properly support the different size cans, and to raise the same into operative relation with the chuck. The feeding-in table is adjusted vertically, so as to properly convey the filled cans on to the supports which are now at a different height. By these simple adjustments, the machine may be readily adjusted for operating upon cans of different sizes.

In order that these different size cans may be brought into contact with the seaming roll, the link 48 is adjusted in length so as to swing the frame into the proper working position for the different size cans.

While I have described my machine as especially adapted for closing a filled can, it will be obvious that from certain aspects of the invention, the machine is equally adapted for placing an end on the can body in the construction of the can, and it will be understood that by the term "end seaming machine" is meant a machine which will either close a filled can, or a machine which will place an end upon a can in the manufacture thereof.

It is obvious that minor changes may be made in the details of construction and arrangement of parts, without departing from the spirit of the invention as set forth in the appended claims. For example, the seaming roll instead of being made in one piece as indicated in the drawings, may be made in sections see Fig. 21. That is to say, the roll may be divided horizontally between the cam grooves, so that if one of the closing grooves should wear faster than the other, a new section may be substituted, without replacing the entire seaming roll. Other changes in the mechanical details will also suggest themselves to those skilled in the art.

Having thus described my invention, what I claim as new and desire to secure by Letters Patent, is:—

1. A can closing machine including in combination, a seaming member having a seaming groove formed therein of uniform cross-section throughout, means for supporting said seaming member, whereby the same may rotate about a vertical axis, traveling supports for the can bodies, means for rotating each support, means for seating a cover in the can body during the travel of the support, and means for causing the supports to carry the can bodies and covers seated thereon in succession and gradually into and out of contact with the seaming member, said seaming member being constructed to operate simultaneously upon a plurality of cans.

2. An end seaming machine including in combination, a circular seaming member having a first and second operation seaming groove in its outer edge, one of said grooves being arranged above the other, each of said grooves extending entirely about said seaming member and being of uniform cross sections throughout, means for supporting and rotating cans and for causing the same to be carried in succession and gradually into contact with the first operation groove and then the second operation groove, said seaming member being constructed so as to operate simultaneously upon a plurality of cans.

3. An end seaming machine including in combination, traveling supports for the cans, a seaming member adapted to operate simultaneously on the cans carried by a plurality of the supports for forming the end seam, said seaming member having a first and a second operation groove, and means for moving the supports for carrying the cans into contact with first one groove and then the other.

4. An end seaming machine including in combination, traveling supports for the can body, means for placing an end on the can body, and a seaming member adapted to operate simultaneously on the cans carried by a plurality of the supports for forming the end seam, said seaming member having closing grooves each of which is uniform in cross-section, and means for moving the supports for carrying the can into contact with the seaming member.

5. An end seaming machine including in combination, traveling supports for the can bodies, means for rotating each support, means for seating a cover in the can body during the travel of the support, and a seaming member adapted to operate simultaneously on the cans carried by a plurality of the supports for forming the end seam during the travel of the supports.

6. An end seaming machine including in combination, traveling supports for the can bodies, means for seating a cover in the can body during the travel of the support, a seaming member adapted to operate simultaneously on the cans carried by a plurality of the supports for forming the end seam during the travel of the supports, said seaming member having a closing groove uniform in cross-section, and means for moving the supports for carrying the cans into contact with the seaming member.

7. An end seaming machine including in combination, traveling supports for the can bodies, means for seating a cover in the can body during the travel of the support, a seaming member adapted to operate simultaneously on the cans carried by a plurality of the supports for forming the end seam during the travel of the supports, said seaming member having a first and a second operation groove located one above the other, and means for moving the supports for carrying the cans into contact with first one groove and then the other.

8. An end seaming machine including in combination a carrier, means for rotating the same, a plurality of can supports mounted on and rotating with said carrier, a seaming roll mounted on the carrier and rotating independently thereof, and means for moving the supports for carrying the cans into contact with the seaming roll, during the travel of the carrier.

9. An end seaming machine including in combination, a carrier, a plurality of can supports mounted on and moving with the carrier, means for rotating the supports as the carrier travels, a seaming roll mounted for rotation independent of the carrier, said seaming roll having a seaming groove uniform in cross-section, and means for moving the supports for carrying the cans into contact with the seaming groove.

10. An end seaming machine including in combination a carrier, a plurality of can supports mounted on and moving with the carrier, means for rotating the cans as the carrier travels, a seaming roll mounted for rotation independent of the carrier, said seaming roll having a first and a second operation groove, and means for moving the supports for carrying the cans into contact with first one groove and then the other, during the travel of the carrier.

11. An end seaming machine including in combination a carrier, a plurality of can supports mounted on and moving with the carrier, means for rotating the cans as the carrier travels, a seaming roll mounted on the carrier for rotation independent thereof, said seaming roll having a first and a second operation groove, one of which is located above the other, each of said grooves extending entirely around the roll, and each being of uniform cross section, and means for moving the supports for carrying the cans into contact with first one groove and then the other.

12. An end seaming machine including in combination a carrier, means for rotating the same, a plurality of rotatable can supports, rotating chucks for each support, means for rotating said chucks, means for feeding can bodies on to said supports, means for raising the supports to cause the cover of the can to engage the chuck, and a seaming roll common to all the supports for the cans for forming an end seam, and means for moving the supports for carrying the cans into and out of contact with the seaming roll during a portion of the travel of the carrier.

13. An end seaming machine including in combination a carrier, means for rotating the same, a plurality of rotatable can supports, a rotating chuck for each support, means for rotating said chucks, means for feeding can bodies on to said supports, means for raising the supports to cause the cover of the can to engage the chuck, and a seaming roll mounted for free rotation on the carrier, said seaming roll having a closing groove of uniform cross section, and means for moving the supports for carrying the cans into and out of contact with the seaming roll during a portion only of the rotation of the carrier.

14. An end seaming machine including in combination a carrier, means for rotating the same, a plurality of rotatable can supports, a rotating chuck for each support, means for rotating said chucks, means for feeding can bodies on to said supports, means for raising the supports to cause the cover of the can to engage the chuck, and a seaming roll having a first and a second operation groove, one of which is located above the other, each of said grooves extending entirely about the roll, and each being of uniform cross section, and means for moving the supports for carrying the cans into and out of contact with the seaming roll during a certain portion of the rotation of the carrier.

15. An end seaming machine including in combination a carrier, means for rotating the same, a plurality of rotatable can supports, a rotating chuck for each support, means for rotating said chucks, means for feeding can bodies on to said supports, means for raising the supports to cause the covers of the cans to engage the chucks, a seaming roll mounted for free rotation on the carrier, means for rotating said seaming roll in proper timing with the chucks, said seaming roll having a closing groove of uniform cross section, and means for moving the supports for carrying the cans into and out of contact with the seaming roll during a portion of the rotation of the carrier.

16. An end seaming machine including in combination a carrier, means for rotating the same, a plurality of rotatable can supports, a rotating chuck for each support, means for rotating said chucks, means for feeding can bodies on to said supports, means for raising the supports to cause the cover of the can to engage the chuck, a seaming roll mounted for free rotation on the carrier, means carried by the chucks for rotating said seaming roll, said seaming roll having a first and a second operation groove one above the other, each of said grooves extending entirely about the seaming roll, and each being of uniform cross section, and means for moving the supports for carrying the cans into and out of contact with each groove of the seaming roll, during a portion of the rotation of the carrier.

17. A can closing machine including in combination, a carrier mounted for rotation about a vertical axis, means for rotating the carrier, a plurality of swinging frames journaled in the carrier, a can support, and a rotating chuck carried by each frame, and a seaming roll mounted for free rotation on the carrier, and means for moving each of said swinging frames so as to move the cans into and out of contact with the seaming roll, during a portion of the rotation of the carrier.

18. A can closing machine including in combination, a carrier mounted for rotation about a vertical axis, means for rotating the carrier, a plurality of swinging frames journaled in the carrier, a can support and a rotating chuck carried by each frame, and a seaming roll mounted for free rotation on the carrier, said seaming roll having a closing groove of uniform cross section, and means for moving said swinging frames to bring the cans into contact with the seaming roll during a portion of the rotation of the carrier.

19. A can closing machine including in combination, a carrier mounted for rotation about a vertical axis, means for rotating the carrier, a plurality of swinging frames journaled in the carrier, a can support and a rotating chuck carried by each frame, and a seaming roll having a first and a second operation groove located one above the other, each groove extending entirely about the roll and being of uniform cross section, means for moving said frames so as to cause the cans to engage each of the seaming grooves during a portion of the rotation of the carrier, and means for raising the swinging frames for carrying the cans so as to position the cans for proper contact with the seaming grooves.

20. A can closing machine including in combination, a carrier mounted for rotation about a vertical axis, means for rotating the carrier, a plurality of swinging frames journaled in the carrier, a can support and a rotating chuck carried by each frame, a seaming roll mounted for free rotation on the carrier, means carried by the chucks for positively rotating said roll, said roll having a first and a second operation groove located one above the other, each groove extending entirely about the roll and being of uniform cross section, and means for moving the swinging frames for carrying the cans into and out of contact first with one groove and then the other, during a portion of the rotation of the carrier.

21. A can closing machine including in combination, a carrier mounted for rotation about a vertical support, means for rotating the carrier, said carrier having a plurality of swinging frames carried thereby, a can support and rotating chuck mounted on each frame, means for rotating the chucks, means for feeding a filled can on to the support during the travel of the carrier, a cover holder mounted on each frame, and means for feeding a cover on to the holder during the travel of the carrier, a seaming roll mounted on the carrier, said seaming roll having a closing groove formed therein, and means for moving the swinging frames for carrying the cans into and out of contact with the closing groove during a portion of the rotation of the carrier.

22. A can closing machine including in combination, a carrier mounted for rotation about a vertical support, means for rotating the carrier, said carrier having a plurality of swinging frames carried thereby, a can support and rotating chuck mounted on each frame, means for rotating the chucks, means for feeding a filled can on to the support, during the travel of the carrier, a cover holder mounted on each frame, means for feeding a cover on to the holder during the travel of the carrier, a seaming roll mounted for free rotation on the carrier, said seaming roll having a closing groove formed therein, and means for swinging the frames to carry the cans into and out of contact with the seaming roll during a portion of the rotation of the carrier.

23. A can closing machine including in combination, a carrier mounted for rotation about a vertical support, means for rotating the carrier, said carrier having a plurality of swinging frames carried thereby, a can support and rotating chuck mounted on each frame, means for rotating the chucks, means for feeding a filled can on to the support during the travel of the carrier, a cover holder mounted on each frame, means for feeding a cover on to the holder during the travel of the carrier, a seaming roll mounted for free rotation on the carrier, said seaming roll having a first and a second operation groove one above the other, each of said grooves extending entirely about the roll, and being of uniform cross section, means for swinging the frames, and for raising the frames, whereby the cans are moved into and out of contact first with one groove and then the other, and during a portion of the rotation of the carrier.

24. A can closing machine including in combination, a carrier adapted to rotate about a vertical axis, means for rotating the carrier, a plurality of swinging frames mounted on said carrier, a rotatable can support, and a rotatable chuck carried by each frame, means for rotating the chucks, means for raising the can supports for bringing the cans into contact with the chucks, a cover holder carried by each frame, means for feeding filled cans on to the supports during the travel of the carrier, means for feeding covers into said cover holder during the travel of the carrier, a seating pad, and means for moving the seating pad so as to hold the cover while it is being seated in the can body, and for moving the seating pad to strip the closed can from the rotating chuck, said cover holder having means for rounding up and centering the can as it is seated on the cover, and a seaming roll mounted on the carrier, said seaming roll having a closing groove of uniform cross section, and means for moving the swinging frames so as to move the cans into and out of contact with the closing groove during a portion of the rotation of the carrier.

25. A can closing machine including in combination, a carrier adapted to rotate about a vertical axis, means for rotating the carrier, a plurality of swinging frames mounted on said carrier, a rotatable can support, and a rotatable chuck carried by each frame, means for rotating the chucks, means for raising the can supports for bringing the cans into contact with the chucks, a cover holder carried by each frame, means for feeding filled cans on to the supports during the travel of the carrier, means for feeding covers into said cover holder during the travel of the carrier, a seating pad, means for moving the seating pad so as to hold the cover while it is being seated in the can body, and for moving the seating pad to strip the closed can from the rotating chuck, said cover holder having means for rounding up and centering the can as it is seated on the cover, a seaming roll mounted for free rotation on the carrier, said seaming roll having a first and a second operation groove located one above the other, each groove extending entirely about the roll, and being of uniform cross section, means for swinging the frames and for raising the frames, whereby the can is moved into and out of contact with the first operation groove, and then the second operation groove of the seaming roll, during a part of the travel of the carrier.

In testimony whereof, I affix my signature, in the presence of two witnesses.

IVAR F. WARME.

Witnesses:
　ARTHUR G. CHASE,
　F. M. BONTA.